(12) United States Patent
Oddera

(10) Patent No.: US 10,413,128 B2
(45) Date of Patent: Sep. 17, 2019

(54) AUTOMATIC CALIBRATION PROCESS FOR COFFEE GRINDER-DOSER APPARATUSES WITH WEIGHING DEVICE AND ELECTRONIC GRINDER-DOSER APPARATUS

(71) Applicant: FIORENZATO M.C. SRL, Vigonza (PD) (IT)

(72) Inventor: Manuel Oddera, Fonte (IT)

(73) Assignee: FIORENZATO M.C. SRL, Vigonza (PD) (IT)

( * ) Notice: Subject to any disclaimer, the term of this patent is extended or adjusted under 35 U.S.C. 154(b) by 606 days.

(21) Appl. No.: 15/164,164

(22) Filed: May 25, 2016

(65) Prior Publication Data

US 2016/0345778 A1    Dec. 1, 2016

(30) Foreign Application Priority Data

May 27, 2015   (IT) .................. 102015000018111

(51) Int. Cl.
*A47J 42/00*   (2006.01)
*A47J 42/44*   (2006.01)
(Continued)

(52) U.S. Cl.
CPC .............. *A47J 42/44* (2013.01); *A47J 42/00* (2013.01); *A47J 42/06* (2013.01); *A47J 42/08* (2013.01);
(Continued)

(58) Field of Classification Search
CPC .. A47J 42/44; A47J 42/38; A47J 42/40; A47J 42/00; A47J 42/06; A47J 42/08; A47J 42/16; A47J 42/18
See application file for complete search history.

(56) References Cited

U.S. PATENT DOCUMENTS 4,789,106 A    12/1988  Weber
4,909,338 A *  3/1990   Vitunic .................. G01G 23/01
                                                   177/164
(Continued)

FOREIGN PATENT DOCUMENTS

GB          594414 A    11/1947
JP        H07141560 A    6/1995
(Continued)

*Primary Examiner* — Faye Francis
(74) *Attorney, Agent, or Firm* — Egbert, McDaniel & Swartz, PLLC

(57) ABSTRACT

Automatic calibration process for electronic grinder-doser apparatuses of coffee in beans provided with an electronic weighing device directly connected to the logic control unit of the apparatus, wherein the grinding times necessary for obtaining the requested dose weight in grams of ground coffee are pre-set, the process being aimed at periodically checking the quantity of coffee actually ground, re-calculating and re-setting the grinding times in the logic unit. The process particularly comprises a first phase (Phase A) of start, a second phase (Phase B) of sampling by multiple short and long detections, a third phase (Phase C) of processing by compensation calculation and a fourth phase (Phase D) of self-adjustment, the second, third and fourth phases (Phases B-D) being totally automatic, that is to say, being sequentially carried out by the electronic grinder-doser apparatus as automatic procedures by the logic control unit.

8 Claims, 4 Drawing Sheets

(51) Int. Cl.
*A47J 42/16* (2006.01)
*A47J 42/08* (2006.01)
*A47J 42/06* (2006.01)
*A47J 42/18* (2006.01)
*A47J 42/38* (2006.01)
*A47J 42/40* (2006.01)
*A47J 31/06* (2006.01)

(52) U.S. Cl.
CPC ............... *A47J 42/16* (2013.01); *A47J 42/18* (2013.01); *A47J 42/38* (2013.01); *A47J 42/40* (2013.01); *A47J 31/0663* (2013.01)

(56) References Cited

U.S. PATENT DOCUMENTS

| | | |
|---|---|---|
| 5,462,236 A | 10/1995 | Knepler |
| 5,522,556 A | 6/1996 | Knepler et al. |
| 5,660,336 A * | 8/1997 | Joseph, Jr. ............... A47J 31/42 241/27 |
| 6,155,158 A | 12/2000 | Anson |
| 6,783,089 B2 | 8/2004 | Lassota |
| 8,616,116 B2 * | 12/2013 | McLaughlin ........... A47J 31/52 99/285 |
| 8,739,687 B1 * | 6/2014 | Tacklind ................. A47J 31/42 99/280 |
| 2014/0263780 A1 * | 9/2014 | Day, Jr. ................... A47J 42/38 241/63 |
| 2014/0366743 A1 * | 12/2014 | Radhakrishnan ....... A47J 31/42 99/286 |

FOREIGN PATENT DOCUMENTS

| | | |
|---|---|---|
| WO | 2005063100 A1 | 7/2005 |
| WO | 20100071390 A1 | 6/2010 |
| WO | 2013015801 A1 | 1/2013 |

* cited by examiner

AUTOMATIC CALIBRATION PROCESS FOR COFFEE GRINDER-DOSER APPARATUSES WITH WEIGHING DEVICE AND ELECTRONIC GRINDER-DOSER APPARATUS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to an automatic calibration process for electronic grinder-doser apparatuses of coffee in beans provided with an electronic weighing device, for the periodic control of the quantity of actually ground coffee and the consequent re-setting of the grinding times associated with the required dose weight in grams; the invention also relates to an electronic grinder-doser apparatus intended to implement said process.

2. Description of Related Art Including Information Disclosed Under 37 CFR 1.97 and 37 CFR 1.98.

The invention finds particular application in the industrial sector of professional bar equipment for making espresso coffee; furthermore, the invention applies to any electronic apparatus for grinding organic products which requires the periodic adjustment of the grinding times.

In general, professional machines for making espresso coffee, which are conventionally called coffee machines, are widely known, which are substantially characterized by a body comprising a boiler which generates hot water and steam sending them to one or more dispensing units in order to cross a corresponding number of filter-holding bowls containing the ground coffee, said bowls being hooked under each dispensing unit, hanging therefrom. In this way the hot water, crossing said filter-holding bowl, takes the aromas contained in the previously charged coffee powder or micro-granules.

Also known is said filter-holding bowl, which is an essential component in the coffee making process, and which consists of a body shaped as a cylindrical container with a funnel-shaped bottom and side hooking tongues, open on the upper part, which contains a filter selected depending on the specific quantity and type of coffee to be made; said bowl is generally provided with a side grip shaped as a cylindrical handle with horizontal development, protruding with respect to the body of the bowl, which allows the operator to easily hook it to said coffee machine and also, before that, to fill the filter with the coffee powder in a specific machine intended to grind it and dose it with precision. Said filter-holding bowl, in particular, must be filled with the exact quantity of coffee powder depending on the number of doses; generally, the bowls used in the professional sector allow to prepare one or two doses simultaneously for each bowl.

Therefore, said grinder-doser is essential in professional catering services, such as in bars and cafés, since it is an apparatus which allows to pass from roasted coffee in beans to powder in micro-granules which, pre-dosed, is necessary for the correct preparation of the usual cup of coffee, preserving its aroma. Downstream of the machine body, which grinds the coffee beans falling from the upper cone, there generally is a container which collects the coffee powder in micro-granules, below which is said bowl supporting element, which sometimes is guided by rails in order to be positioned correctly for the filling of the desired dose. Professional coffee grinding-dosing devices, conventionally known as grinder-dosers, are mainly subdivided into standard types and automatic types, wherein the first have a lever switch of the slide valve type which substantially leaves to the user the control of how much and how to grind the coffee, while the latter are provided with buttons and/or sensors which automatically control dispensing upon reaching such a threshold.

It is known that such electronic grinder-dosers have the advantage of limiting the operations by the operator who, sequentially, only has to position the bowl containing the filter corresponding to the pre-selected dose and then select the pre-selected grinding dose by activating the corresponding control, generally an electromechanical or electronic touch switch. Generally, in these apparatuses the quantity of coffee related to one or two doses, that is to say, for one or for two cups of espresso coffee, is previously pre-set by setting on the machine the parameters corresponding to the duration of grinding, that is to say, to the time of motor operation which is necessary to dispense the desired weight of ground product.

The operators of the sector also know that in high-level professional activity, as for example occurs in cafés and in restaurants, it is extremely important to adjust the grinding time with precision in order to obtain the exact quantity, in weight, of ground coffee since this is variable depending on the granulometry and on the type of coffee used, on the wear of the machine and, in particular, on environmental conditions among which humidity and temperature; therefore, it basically occurs that the duration of grinding is fixed, as it is set with the setting of the apparatus, while the dispensed dose is from time to time greater or smaller with respect to the desired weight, depending on said parameters. As a consequence, in these cases, the professional operator intervenes periodically on the setting of the grinder-doser, even several times a day, manually modifying by progressive approximations the duration of said operating grinding in order to obtain the exact weight of ground and dispensed coffee.

Therefore, it has been observed that the conventional and known systems for adjusting the dose weight in grams are little suitable for a professional activity which includes the frequent preparation of espresso coffee wherein, in particular, the product in beans is ground and dispensed in the respective filter-holding bowl respecting the exact dose weight in grams, said dose weight in grams being set directly or by means of the corresponding grinding time; therefore, such settings are pre-arranged by setting the grinder-doser according to the operator's specific requirements. In more detail as to the known and conventional solutions of control and adjustment of the actual dispensed dose, in particular, we recall various systems for weighing the ground product, being of the manual type and separate from the grinding phase, that is to say, as a periodic control sampling, or being of the automatic type and simultaneous to grinding; for example, one should remember the solutions as in documents GB594414 (Valerino), U.S. Pat. No. 4,789,106 (Weber), JPH07141560 (Masayuki), U.S. Pat. No. 6,155,158 (Anson), WO20100071390 (Vazquez Palma et al.), WO2005063100 (Malykke).

Finally, among the recently proposed solutions for facilitating daily operations in the professional sector, we have observed a wide spreading of various technologies for the automatic detection of objects or devices, in order to identify them or also to collect information about them, depending on the specific field of application; in particular, the technology of automatic recognition based on radio frequency, also known by the acronym RFID (Radio Frequency Identification) is widespread and has also been recently proposed in the industrial sector of bar equipment. Among the automatic recognition systems for the controlled dispensing of the correct dose, we would like to recall for example the advantageous solution as in TV2014A000113 (Fiorenzato) which provides an accessory device of automatic recognition of the filter-holding bowl by a coffee grinder-doser, being made up of an emitter apparatus emitting a radio-frequency identification signal and of a reader apparatus which detects and processes said signal in order to automatically dispense in the filter of the bowl the corresponding dose of ground coffee, for example for one or two cups, without manual selection. The emitter apparatus is made up of a fastening ring applicable to the handle of the bowl which supports a passive transponder of the RFID Tag type; the reader apparatus is made up of an RFID antenna, parallel to said RFID Tag, and of the relative RFID control card which is directly connected to it via cable and is also connected to the logic control unit of the grinder-doser for said automatic dispensing.

For the purpose of determining the prior art related to the proposed solution, a conventional check was made, searching public archives, which has led to find some prior art documents, among which:

D1 U.S. Pat. No. 5,462,236 (Knepler)
D2 U.S. Pat. No. 6,783,089 (Lassota)
D3 U.S. Pat. No. 5,522,556 (Knepler et al.)
D4 Baratza Forte, operation manual, 2013 (www.baratza.com)
D5 WO2013015801 (Rego et al.)

More specifically, D1 proposes a grinder-doser intended to calculate the weight of the desired dose as a function of grinding time in such a way that the operator, by means of a particular electronic calibration circuit, which is also interfaced with the logic control unit of the grinder-doser, manually inserts the weight of the actually ground dose in order to correct its setting.

D2, D3 and D4 propose electronic weighing systems which are constructively and electronically integrated in the grinder-doser in such a way as to directly detect the weight of the dispensed product, including the operatively associated container, and interrupt grinding upon reaching the predetermined weight; the weighing device is of the scale type with a horizontal plate on which the container has to be placed, with single extensometers as in D2 or with a central load cell as in D4, or is of the type with a side arm lever and an opposite load cell with respect to the container, as in D3.

D5 describes a device for measuring and displaying the exact quantity of ground coffee dispensed in a portafilter basket, in a coffee grinder-doser of the professional type, measuring the weight variation from the support of the basket; this device is of the electronic type and comprises a remote display for displaying the measured value and also comprises a particular portafilter basket equipped with buttons with digital user interface.

Therefore, it is reasonable to consider as known:
an apparatus of the coffee grinder-doser type comprising means for dosing the quantity of ground and dispensed coffee, wherein said means consist of manual lever devices or, alternatively, electromechanical devices, in such a way as to select the dispensing in one or two doses;
an apparatus of the coffee grinder-doser type, wherein the coffee powder is dispensed directly in the filter-holding bowl positioned in a supporting fork below the dispenser;
an apparatus of the electronic coffee grinder-doser type for professional use, wherein the dispensing of the desired quantity of coffee in weight, that is to say, the dose weight in grams, is fixed as it is previously pre-set by calculating the corresponding grinding time;
an apparatus of the electronic coffee grinder-doser type for professional use, wherein the dose weight in grams is measured during the actual dispensing as the coffee is weighed directly with its operatively associated container by means of an integrated weighing device which is connected to the logic control unit in order to automatically interrupt grinding upon reaching the previously pre-set weight;
a control and calibration system of the dispensed dose, for coffee grinder-dosers based on the setting of the grinding time, which provides the taking of an actually ground dose as a sample to be weighed separately in order to manually make the changes to the setting of the machine, by progressive approximations, or to manually insert the detected weight in an interposed interface circuit which carries out the calculation and the adjustment of the logic control unit.

Drawbacks

Most of the above-described solutions aim at overcoming the known difficulties experienced every day by professional operators in obtaining from the grinder-doser the exact quantity of ground coffee; in general, it has been observed that the conventional solutions based on the taking and on the detection of the weight of a sample dispensing in order to calculate the corrections to be made to the setting of the apparatus are slow, uncomfortable and also imprecise, since many approximations are necessary before obtaining the desired result. In practice it has been observed that a common external scale involves several manual operations, also with a high risk of errors, that is to say, substantially independent with respect to the grinder-doser as it is not connected to the logic control unit; in particular the most evolved solutions, as for example in D1, provide the addition of a complex electronic calibration circuit which interacts with said logic unit acting as an interface with the user, who must carry out the weighing and insert the data manually in such a way that said circuit is able to act on the logic unit of the grinder-doser.

In the solutions which weigh the product during dispensing, as for example in D2, D3 and D4, a problem has been found, which is intrinsically linked to the tolerances of the weighing devices and which makes such solutions little effective. In particular, we have observed that in order to dynamically measure with precision variations in a weight of a few grams, generally between 7 and 7.5 grams in the case of a single dose of ground coffee, it is necessary to have an extremely accurate high-sensitivity weighing device, for example an electronic load cell with extensometers, which is thus unsuitable for the strong vibrations which the internal motor of the grinder-doser transmits to the whole body of the apparatus, thus making the weighing value not very reliable and also possibly decalibrating the system.

Furthermore, it has been observed that the solutions of control of the ground dose having a heavy container, that is to say, with a considerably greater tare with respect to the content, and also with an asymmetric and protruding shape which must be handled with care, are thus unsuitable for detecting a few hundredths of a gram, as for example in D5 wherein the portafilter basket is weighed separately on a small-sized separate device which is also provided with electronic interface; for a professional use, such a solution is expensive, fragile, uncomfortable in use and inaccurate in results.

Therefore, from the above considerations it can be stated that, since they are not known yet, it would be extremely desirable for professional operators to find effective solutions of automatic calibration of grinder-dosers also equipped with an electronic weighing device intended to detect slight weight variations, to eliminate the manual taking and weighing operations and automatically carry out the detections and the adjustments, by calculating and autonomously re-setting times also compensating for the variables which affect dispensing; in particular, it can be stated that, since they are not known yet, it would be extremely desirable for professional use to find automatic calibration processes and grinder-dosers intended to implement them which allow to frequently carry out said adjustment of the grinding time with great accuracy in such a way as to obtain exactly the desired dose weight in grams.

Considering all the above, there is the reasonable need for the companies of the sector to find some innovative solutions for overcoming the above-described drawbacks.

BRIEF SUMMARY OF THE INVENTION

These and other aims are achieved by the present invention according to the characteristics as in the appended claims, solving the above-described problems by means of an automatic calibration process (10) for electronic grinder-doser apparatuses of coffee in beans (20) provided with an electronic weighing device (210-2) directly connected to the logic control unit (203) of the apparatus, wherein the grinding times, which are necessary for obtaining the requested dose weight in grams of ground coffee, are pre-set, said process being aimed at periodically checking the quantity of actually ground coffee, re-calculating and re-setting the grinding times in said logic unit. Said process (10) comprises, in particular, a first phase (Phase A) of start, a second phase (Phase B) of sampling by multiple short and long detections, a third phase (Phase C) of processing by compensation calculation and a fourth phase (Phase D) of self-adjustment, said second, third and fourth phases (Phases B-D) being totally automatic, that is to say, being carried out sequentially by the electronic grinder-doser apparatus (20) as automatic procedures by the logic control unit (203).

In this way, by the considerable creative contribution the effect of which constitutes an immediate and important technical progress, various remarkable advantages are achieved.

A first aim was to realize an automatic process for the calibration of grinding times; the invention allows professional operators to frequently calibrate the grinder-doser apparatus, even several times an hour, in order to obtain the desired dose weight in grams with great precision, in an easy and fast way. Such an advantage, in particular, allows professional operators to keep constant the weight of each dose of actually ground and dispensed coffee, and also allows to keep constant the final quality of the espresso coffee served to a customer, thus limiting any consequences which may be caused by the different variables involved, such as the quality and the state of preservation of the beans, the state of wear and maintenance of the machine and the environmental conditions.

A second aim was to realize a grinder-doser apparatus, provided with a precision electronic device for detecting weight, which is intended to implement said automatic calibration process in an optimal way.

A third aim was to require less attention and physical effort by professional operators, said process and said apparatus being simple in use, that is to say, mainly autonomous, in such a way as to limit the operations carried out by the operator at the initial arrangement, also reducing the possibilities of human error.

To conclude, these advantages have the important merit of obtaining an integrated calibration system for grinder-doser apparatuses for professional use which is accurate, being based on multiple detections, fast and versatile in use, of easy constructive and electronic implementation, inexpensive and with good technological content.

These and other advantages will appear from the following detailed description of a preferred embodiment with the aid of the schematic drawings enclosed.

DETAILED DESCRIPTION OF THE INVENTION

Figure 1:
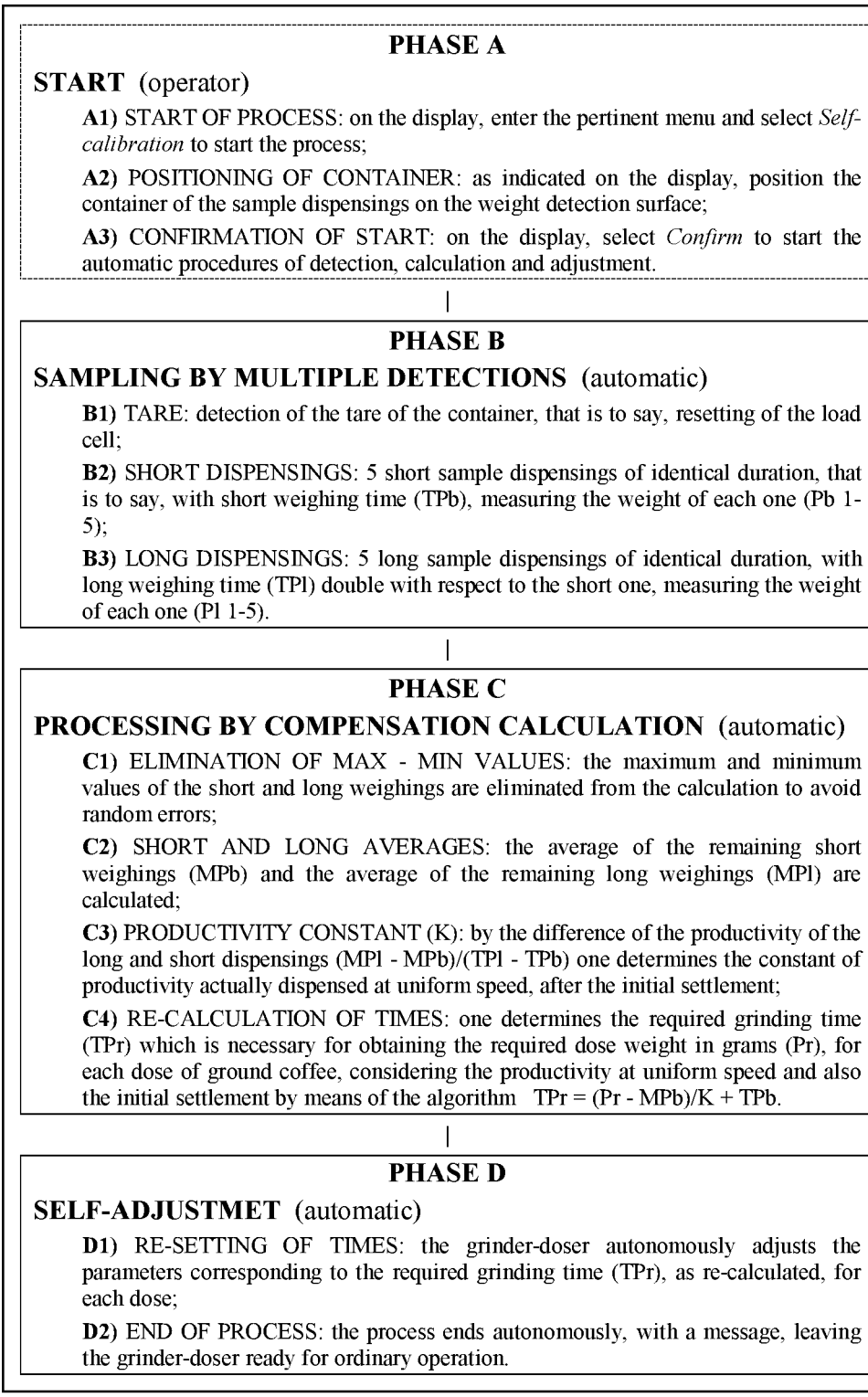
FIG. 1 schematically shows the automatic calibration process according to the invention, for the periodic adjustment of grinding times, according to operating phases (Phases A-D) and related sub-phases.
Figure 2:
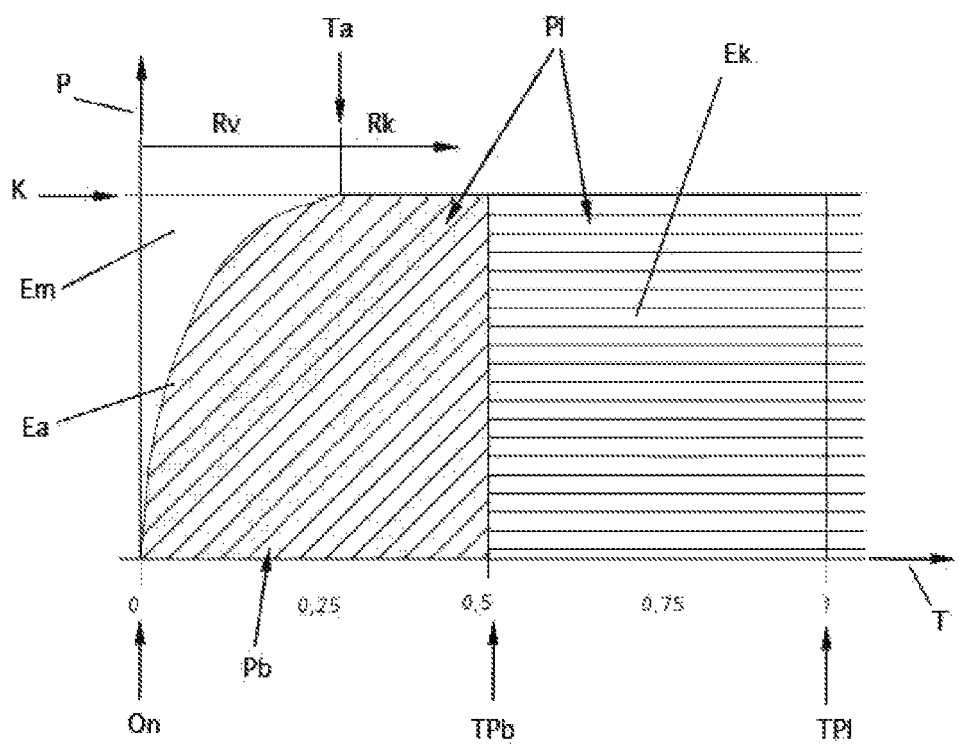
FIG. 2 shows in the form of a two-dimensional diagram the grinding time of the short weighings (TPb) and long weighings (TPl), dispensed for sampling for the purposes of automatic adjustment, with respect to the actual productivity corresponding to it, that is to say, the quantity of product actually ground and dispensed of the apparatus in the time unit; said time being measured in seconds (sec), and said productivity being indicatively measured in grams per second (g/sec). In particular, we point out the initial settlement time (Ta) at variable speed (Rv), that is to say, from the start of grinding until reaching the uniform speed (Rk) with constant productivity, said initial period being entirely included in the short weighing time (TPb); in particular, the non-dispensing (Em) related to said settlement period is included in the self-adjustment compensation calculation according to the invention.
Figure 3:
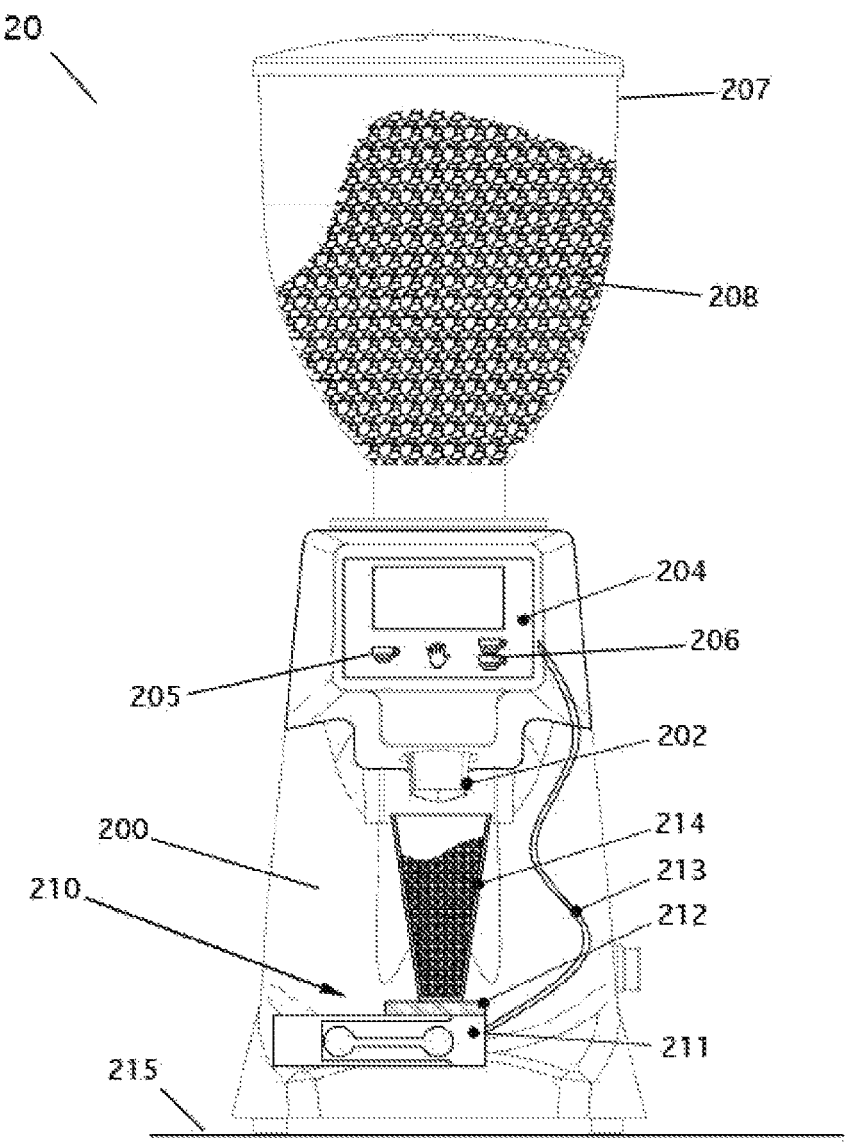
FIGS. 3 and 4 orthogonally show from the front and from the side the electronic grinder-doser which advantageously is self-calibratable according to the automatic calibration process according to the invention, as below the dispenser it is provided with an electronic weighing device directly connected to the logic control unit.
Figure 4:
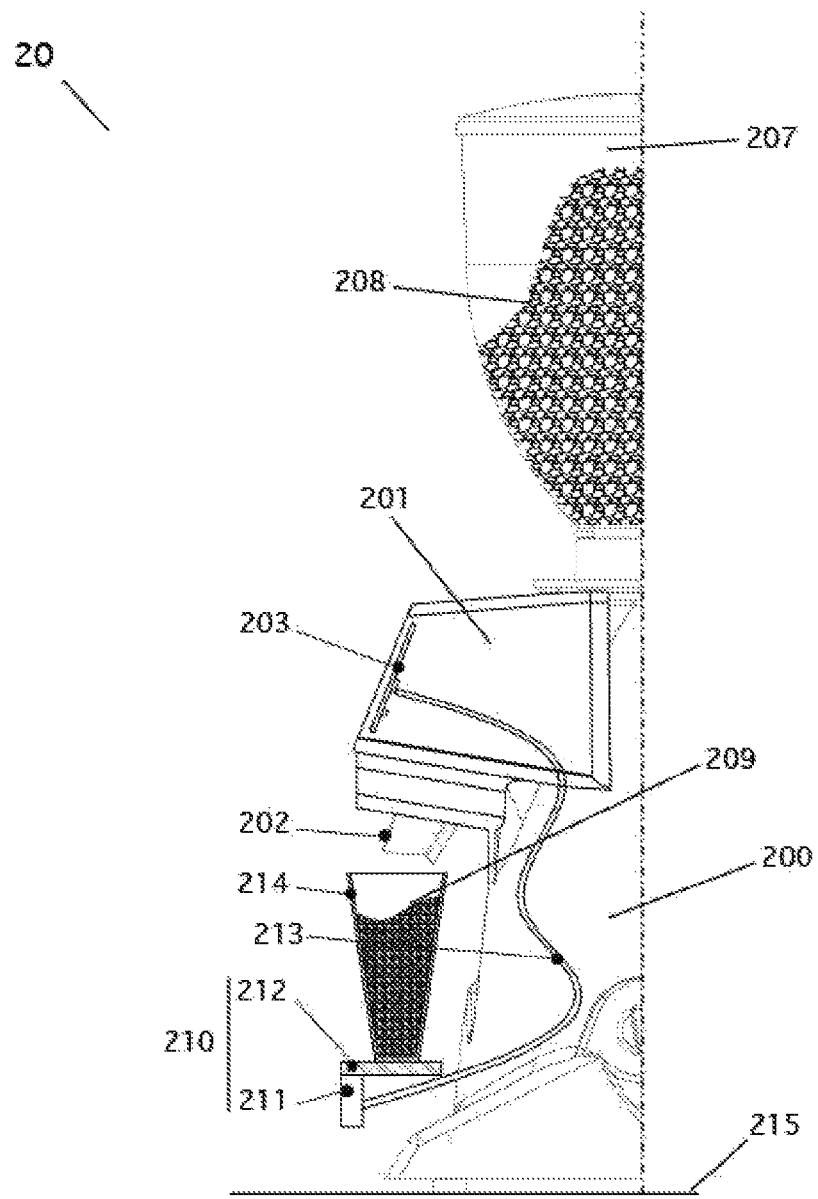

With reference also to the Figures (FIGS. 1-4), the present invention relates to an automatic calibration process (10) (FIGS. 1-2) and to an electronic grinder-doser apparatus (20) of coffee in beans which is advantageously self-calibratable according to said process (FIGS. 3-4); in particular, said process is suitable for a grinder-doser apparatus which frontally integrates an electromechanical system of controlled distribution of the dose of ground coffee, called dispenser (201), with the shutter managed directly by the logic control unit (203) and which in particular is provided with an electronic weighing device (210) directly connected to said logic unit (203) for the periodic adjustment of the set grinding times depending on the quantity of actually ground and dispensed coffee, which is variable due to several factors. Said process (10) and said apparatus (20) enable the professional operator to frequently carry out in an easy way and with high precision said periodic adjustment of the set times.

For the purposes of said calibration, the invention (10, 20) needs a high-precision weighing device (210), of the electronic scale type with a horizontal detection surface (212) with a load cell (211) of the single point load cell type, intended to detect a weight up to at least 20 grams measuring its variations to a hundredth of a gram (FIGS. 3-4); said load cell (211) makes immediately available to said logic control unit (203) the signal of presence-absence of a load, for the purpose of the automatic activations and of the detections, providing the exact value of the weighing in hundredths of a gram in such a way as to allow for the consequent self-adjustment of the apparatus (20, 203) according to said process (10). Such an automatic calibration procedure is possible because said cell (211) is directly managed by the logic control unit (203) of the apparatus (20). As a non-exhaustive example, a cell of the type marketed by the German company Siemens AG under the name of Siwarex R Load Cells Sp Series, www.w3.siemens.com, in the customized configuration for weights lower than 0.1 Kg and detections to the hundredth of a gram, is suitable for the invention.

For the purposes of the invention (10, 20) said electronic weighing device (210-2) is placed below the dispensing spout (202) in such a way as to arrange on it an empty container (214) shaped as a cup and suitable for containing and weighing the ground coffee during the sequential sample dispensings at intervals provided by the calibration process (10). In the preferred embodiment said device (210) is integrated into the body (200) of the grinder-doser apparatus being externally incorporated to it, as a protuberance or enlarged base, or being mechanically joined to it by means of a fixing element in the form of a bracket.

For said automatic calibration process (10) particularly suitable is an electronic grinder-doser apparatus (20) which comprises (FIGS. 3-4):

an electronic weighing device (210) with a load cell (211) with a horizontal detection surface (212), as described above, which is integrated below the dispenser (201-2) to place on it a removable container able to detect the multiple dispensings of the automatic calibration process (10); said device (210) being directly connected to the logic control unit (203) of the grinder-doser (20) to send and receive information and/or commands;

a removable containing means (214) of the cup container type, for containing and weighing the sample dispensings;

a logic control unit (203), which also checks directly said load cell (211) in such a way as to automatically manage the process;

means of direct connection between said electronic weighing device (210) and said logic control unit (203), of the type with a connection cable (213) for the transfer of data and for power supply;

man-machine interface means which are integrated in the body (200-1) of the grinder-doser and are intended to receive and send commands and information, of the display (204) type with a touchscreen and also icons for the immediate identification of information or commands, for example there is an icon for the single dose (205) of ground coffee and an icon for the double dose (206);

an automatic management program of the calibration process (10), pre-installed in said logic control unit (203).

Therefore, said electronic weighing device (210-2) makes immediately available to said logic control unit (203) the signal of presence-absence of a load, for the purposes of the automatic activations, and also the exact value of the single weighing in hundredths of a gram, in such a way as to allow said management program to automatically execute the calibration process (10) by sequential operating phases, as automatic procedures, comprising at least one phase of sampling by multiple detections, one phase of processing of the data by means of compensation calculation algorithms and one phase of self-adjustment of the grinding times.

In particular, in professional use it has been observed (FIG. 2) that upon start of grinding (On) the dispensing of the ground product is not immediately constant, that is to say, there is an initial settlement period (Ta) wherein the settlement dispensing (Ea) progressively increases until reaching a constant productivity (K), that is to say, being at a uniform grinding speed (Rk) with constant dispensings (Ek). In more detail, it has been observed that at the variable speed (Rv) phase the non-dispensing (Em), with respect to said constant productivity (K, Ek), is significant for the purposes of the accurate calculation of the grinding times necessary for obtaining the required dose weight in grams. However, it is also known that said variable speed (Ta, Rv) is different from time to time depending on the type of motor, wear conditions of the components and on the boundary conditions, among which environmental conditions. As a result, said automatic management program and said automatic calibration process (10) must necessarily consider said initial settlement (Ta, Ea, K, Ek) and compensate for it, in such a way as to allow for a more effective adjustment of the dose weight in grams, achieving the desired accuracy in dispensing and in order to keep the quality of the service as high as possible.

Therefore, in the logic control unit (203) of each grinder-doser (20) an automatic management program is installed, which also considers everything set out above, being substantially conventional software which is particularly parameterized for the purposes of the invention in such a way as to enable the execution of the automatic calibration process (10) provided by the invention, according to its operating phases, comprising a first phase (Phase A) of start, a second phase (Phase B) of sampling by multiple detections, a third phase (Phase C) of processing by compensation calculation and a fourth phase (Phase D) of self-adjustment, and wherein at least said second, third and fourth phases (Phases B-D) are totally automatic, that is to say, they are carried out sequentially by said apparatus (10), as automatic procedures, being managed by said logic control unit (203) by means of said automatic management program; said first phase (Phase A) is preliminary to said automatic procedures and is to be carried out by the operator.

In particular (FIG. 1), said automatic calibration process (10) includes the following operating phases (Phases A-D) and sub-phases:

Phase A) of start, carried out by the operator for the purpose of pre-arranging the apparatus for the following automatic detection procedures and comprising the following sub-phases: A1) start of the process from the display, A2) positioning of the empty container onto the load cell, A3) confirmation of the start of the automatic procedures;

Phase B) of sampling by multiple detections, carried out automatically by the apparatus as an automatic procedure and including short and long grinding weighings, that is to say, by means of sequential dispensings of ground coffee at intervals with the simultaneous detection of the weight of each dispensing, comprising the following sub-phases: B1) detection of the tare of the empty container, B2) short dispensings, B3) long dispensings;

Phase C) of processing by compensation calculation, carried out automatically by the apparatus as an automatic procedure by means of the calculation of the quantity of actually dispensed coffee in the time unit, both at the constant speed and at the variable speed corresponding to the grinding start; in order to associate the exact grinding time with the set dose weight in grams considering the actual operating conditions, also compensating for the initial settlement time (Ta) and for possible detection or grinding errors, said calculation phase comprises the following sub-phases: C1) elimination of the maximum and minimum values, C2) calculation of the short and long averages, C3) calculation of the productivity constant, C4) re-calculation of the correct grinding times for each dose also considering the initial settlement.

Phase D) of self-adjustment of the apparatus, carried out automatically by the apparatus as an automatic procedure and comprising the following sub-phases: D1) automatic adjustment of the grinding times, D2) end of the entire process with message and leaving the apparatus correctly calibrated, that is to say, set and pre-arranged for ordinary operation.

In more detail as to said Phase A of start, it is provided that on said display (204) in correspondence of the pertinent menu the operator first selects "Self-calibration" to start the process (sub-phase A1) and then, following the instructions on said display, positions the empty container (214) on the detection surface (211) of the load cell (210) below the dispensing spout (202) (sub-phase A2); afterwards, the operator must select on said display "Confirm" (sub-phase A3) in order to start the automatic procedures of detection, calculation and adjustment of the following phases.

In more detail as to said Phase B of sampling by multiple detections, it includes the automatic resetting of the load cell (210-2) by means of the detection of the tare of the container (214) (sub-phase B1) and following multiple sequential dispensings simultaneously detecting the weight of each dispensing (sub-phases B2-3); in particular, there are first at least 3 short dispensings, of identical duration (sub-phase B2) and preferably more than 3, for example 5, and then at least 3 long dispensings, wherein said dispensings have the same duration with respect to each other (sub-phase B3) and preferably are more than 3, for example 5. Said short dispensings (sub-phase B2) therefore refer to a precise short grinding time, also called short weighing time (TPb), which is measured in hundredths of a second and acts as reference for the following calculations; for example, we consider 5 dispensings of 0.50 seconds each, with which the corresponding 5 short weighings (Pb 1-5), in hundredths of a gram, are associated. Said long dispensings (sub-phase B3), on the other hand, are equal in number but have a long duration or weighing time (TPl) which for calculation convenience is double with respect to said short dispensings; therefore, following the same example, there are 5 dispensings of 1.00 second each, measuring the corresponding 5 long weighings (Pl 1-5), in hundredths of a gram.

In more detail as to said Phase C of processing by compensation calculation, the automatic processing of the detected weights is provided wherein, for greater reliability and precision, the values possibly corresponding to detection or grinding statistical errors, that is to say, the extreme values corresponding to the maximum and minimum weighings related to said short weighing time (TPb) and to said long weighing time (TPl), are previously eliminated from the calculation, for a total of four values eliminated (sub-phase C1). Afterwards, the average of the remaining short weighings (MPb) and the average of the remaining long weighings (MPl) (sub-phase C2) are calculated; then, by the difference between the productivities of the short and long period (MPl MPb)/(TPl TPb) it is determined with a precision to the hundredth of a gram how much coffee is actually dispensed by that apparatus every second at uniform speed, that is to say, with constant productivity (K) (sub-phase C3). Therefore, by comparison with said constant productivity, the grinding times are re-calculated for each desired dose (sub-phase C4) also considering the period of initial settlement at variable speed, that is to say, from the start of grinding until reaching the uniform speed with constant productivity, said settlement period being entirely included in said short dispensing.

In more detail as to said phase D of self-adjustment, it basically includes the automatic adjustment of the operating parameters of the apparatus on the basis of what has been previously calculated, that is to say, the correct grinding times (sub-phase D1) are automatically set in association with the dose weight in grams already set for each dose. At the end of said self-adjustment the entire process (20) is automatically terminated (sub-phase D2), with the message on the display (204) of correct execution, that is to say, leaving the apparatus (20) set, namely calibrated, and already ready to operate ordinarily once the container (214) has been removed.

As a non-exhaustive example, on the basis of the above, according to the preferred embodiment of the invention an automatic calibration process (20) of said apparatus (10) is provided, which is set and carried out as follows:

desired dose weights in grams: single dose=7.5 g, double dose=14.5 g;

sub-phase B2) number of short dispensings: 5, each having a short weighing time (TPb)=0.50 seconds; short weighings (Pb), namely related to each consecutive dispensing with a short weighing time: Pb1=3.50 g, Pb2=3.20 g, Pb3=3.1 g, Pb4=3.3 g, Pb5=3.00 g;

sub-phase B3) number of long dispensings: 5, each having a long weighing time (TPl)=1.00 second; long weighings (Pl), namely related to each consecutive dispensing with a long weighing time: Pl1=6.60 g, Pl2=6.70 g, Pl3=7.00 g, Pl4=6.50 g, Pl5=6.60 g;

sub-phase C1) elimination of the extreme weighings, namely: Pb1 and Pb5 corresponding to the maximum and minimum short weighings, Pl3 and Pl4 corresponding to the maximum and minimum long weighings;

sub-phase C2) calculation of the average of the remaining short and long weighings: MPb=Sum Pb/3=3.2 g, MPl=Sum Pl/3=6.6 g;

sub-phase C3) calculation of the productivity constant (K), that is to say, how many grams/second are actually dispensed at uniform speed namely outside the initial settlement:

$$K=(MPl-MPb)/(TPl-TPb)=6.8 \text{ g/sec};$$

sub-phase C4) re-calculation of the required weighing time (TPr) namely of the grinding time necessary for obtaining the exact set dose weight in grams or required weight (Pr), in correspondence of each desired dose, in such a way as to compensate for the initial losses with respect to the productivity constant. Said re-calculation can be made according to the following algorithm:

$$TPr=(Pr-MPb)/K+TPb$$

therefore, if one requires the exact dispensing of 7.5 g for the single dose, the required time is: $TPr1=(7.5 \text{ g}-3.2 \text{ g})/6.8 \text{ g/sec}+0.5 \text{ sec}=1.13$ seconds; if, on the other hand, one requires the exact dispensing of 14.5 g for the double dose, the required time is: $TPr2=(14.5 \text{ g}-3.2 \text{ g})/6.8 \text{ g/sec}+0.5 \text{ sec}=2.16$ seconds.

Therefore, in professional practice it has been observed that said automatic calibration process (10, Phases A-D) applied to said electronic grinder-doser (20) allows professional operators to frequently carry out, that is to say, several times a day, in an easy and fast way, the adjustment of the pre-set grinding times in such a way as to obtain with precision the desired dose weight in grams of actually ground and dispensed product, said dose weight in grams depending on several variables as shown above.

Finally, in an embodiment variant of said electronic grinder-doser apparatus (20), it is further provided to integrate an automatic recognition system with RFID technology by means of the same logic control unit (203), it being of the type described in said document TV2014A000113 (Fiorenzato). Such a system advantageously enables automatic recognition by a reader apparatus directly connected to said logic unit (203) of a filter-holding bowl or any container, for example a container for samples, which are equipped with an emitter apparatus emitting the identification signal in radio-frequency, for processing this signal in order to activate a particular dispensing or to start a phase of the calibration process (10). For the purposes of the invention, it is easily possible to integrate the elements constituting the RFID reader apparatus, namely the RFID antenna and the RFID control electronics with respective transformer, in correspondence of the electronic weighing device (210) below the dispenser or inside the housing space of the dispenser together with said logic control unit (203).

REFERENCE (10) automatic calibration process, for the periodic adjustment of the set grinding times depending on the quantity of actually ground and dispensed coffee;
(20) electronic grinder-doser for coffee, provided with an electronic weighing device for the periodic adjustment of the set grinding times depending on the quantity of actually ground and dispensed coffee;
(200) main body of the grinder-doser;
(201) automatic dispenser with shutter;
(202) dispensing spout;
(203) logic control unit;
(204) display with touchscreen;
(205) icon for single dose of ground coffee;
(206) icon for double dose of ground coffee;
(207) cone-shaped container for beans of roasted coffee;
(208) roasted coffee in beans;
(209) ground coffee;
(210) electronic weighing device;
(211) load cell;
(212) horizontal detection surface or weighing plate;
(213) connection and power supply cable;
(214) removable container for sampling by multiple detections;
(215) support plane;
(Ea) settlement dispensing, quantity dispensed at variable speed;
(Ek) constant dispensing, quantity dispensed at uniform speed;
(Em) non-dispensing for the initial settlement;
(K) productivity constant;
(On) start of grinding;
(P) productivity, product actually ground and dispensed by the apparatus in the time unit, in grams per second;
(Pb) short weighing, weight relating to the short sample dispensing;
(Pl) long weighing, weight relating to the long sample dispensing;
(Pr) required weight or desired dose weight in grams;
(Rk) uniform speed, with constant productivity, with the motor at the maximum number of revolutions;
(Rv) variable speed, with growing productivity, that is to say, from the start until reaching the uniform speed;
(Tr) required grinding time;
(Ta) initial settlement period, at variable speed;
(TPb) time of the short weighing, grinding time for each short sample dispensing;
(TPl) time of the long weighing, grinding time for each long sample dispensing;
(TPr) required weighing time, necessary grinding time for obtaining the required dose weight in grams, in operation.

I claim:

1. A process of calibrating an electronic grinder-doser of coffee beans, the grinder-doser being provided with an electronic weighing device directly connected to a logic control unit in which grinding times are pre-set in order to obtain a desired weight of ground coffee from the grinder-doser, the process periodically controlling a quantity of coffee actually ground and re-calculating and resetting grinding times in the logic control unit, the process comprising:
   starting the process;
   sampling by multiple detections;
   processing by compensation calculating; and
   self-adjusting the process, wherein the steps of sampling, processing and self-adjusting are automatic and carried out sequentially by the grinder-doser and managed by the logic control unit, the step of starting being carried out by an operator, the step of starting comprising:
      positioning an empty container on the electronic weighing device, wherein the electronic weighing device is a load cell with a horizontal detection surface and is integrated below a dispenser corresponding to a dispensing spout;
      detecting weights up to 20 grams by the electronic weighing device; and
      measuring variations in the detected weight to a hundredth of a gram, the electronic weighing device being directly connected to the logic control unit so as to send and receive commands thereto and therefrom;
   the step of sampling comprising:

dispensing multiple sequential samples at intervals with respect to each other according to at least one cycle of short-duration dispensing and at least one cycle of long-duration dispensing, the long-duration dispensing being longer than the short-duration dispensing; and detecting a weight of each of the dispensings;

the step of processing comprising:

processing times of the dispensings and the weights of the dispensings according to a compensation calculation and in relation to an initial settlement time; and recalculating values of an exact duration of the motor of the grinder-doser necessary to obtain a required grinding time for a desired dose of coffee;

the step of self-adjusting comprising:

automatically resetting parameters that regulate the required grinding time by the logic control unit according to the recalculated values.

2. The process of claim 1, the step of starting further comprising:

starting the process from a display; and confirming thea starting of automatic calibration procedures.

3. The process of claim 1, the step of sampling further comprising:

detecting a tare of the empty container;

dispensing at least three samples identical to each other and having a duration of at least 0.3 seconds so as to exceed the settlement time; and dispensing another at least three samples identical to each other having a duration of the previously dispensed at least three samples.

4. The process of claim 1, the step of processing further comprising:

eliminating maximum values and minimum values of the processed times;

calculating average times of the dispensings;

calculating productivity at a uniform speed in accordance with the initial settlement time; and recalculating the grinding time for the desired dose relative to the initial settlement time.

5. The process of claim 4, the step of eliminating being two maximum and minimum short weighings and two maximum and minimum long weights, the step of calculating being a calculation of the average of remaining short weighings and long weighings at the step of elimination, the step of processing further comprising:

calculating a productivity constant (K, Ek) based on a quantity of actually ground and dispensed coffee at a uniform speed, the step of recalculating the grinding time necessary to obtain the desired weight being in accordance with:

$$Tr=(Pr-MPb)/K+TPb$$

where

Pr=required dose weight

MPb=calculated average remaining short weight

K=productivity constant

TPb=time of short duration dispensings.

6. The process of claim 5, wherein a time of the long-duration dispensings is twice a time of the short-duration dispensings.

7. The process of claim 6, wherein the time of the short-duration dispensings is 0.5 seconds and the time of the long-duration dispensings is 1.0 second with a tolerance of +/−20%.

8. The process of claim 7, wherein the short-duration dispensings is 0.5 in number and the long-duration dispensings is 5 in number.

* * * * *